Jan. 10, 1950
J. M. HARRIS, JR
2,494,091
FLOW VALVE
Filed Sept. 22, 1944
2 Sheets-Sheet 1
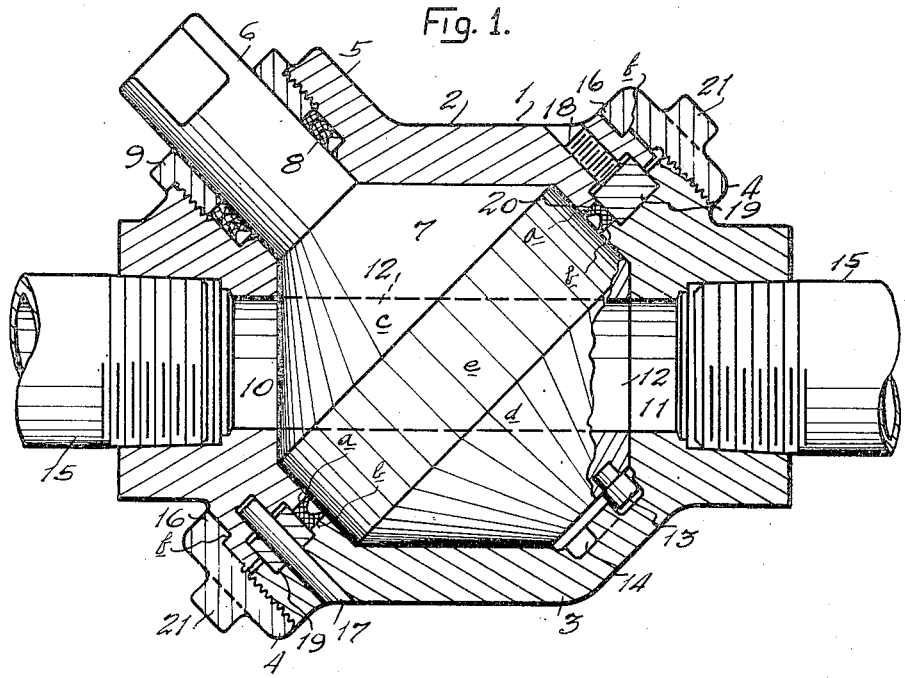
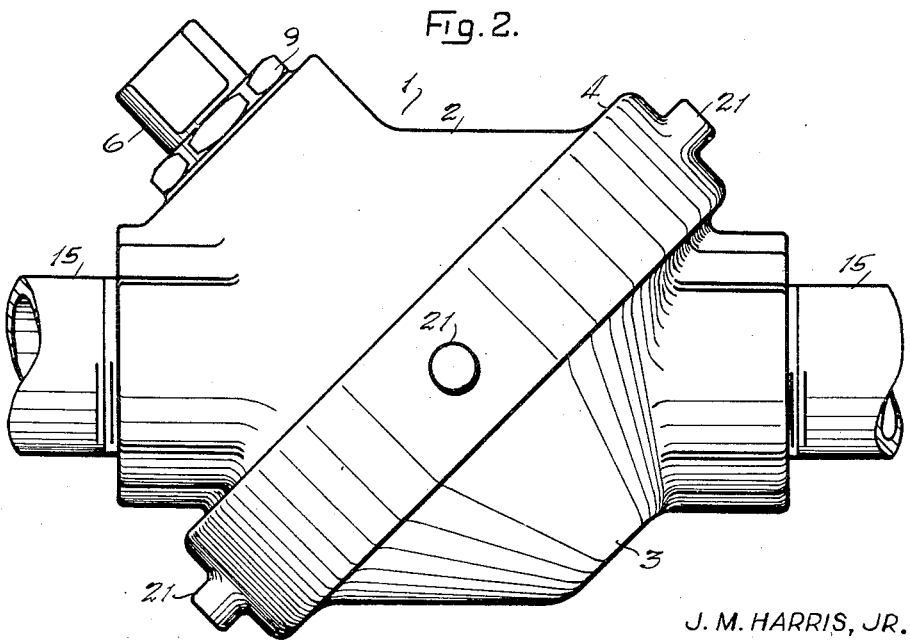
J. M. HARRIS, JR.
INVENTOR.
BY Cecil L. Wood
ATTORNEY.

Jan. 10, 1950
J. M. HARRIS, JR
2,494,091
FLOW VALVE
Filed Sept. 22, 1944
2 Sheets-Sheet 2
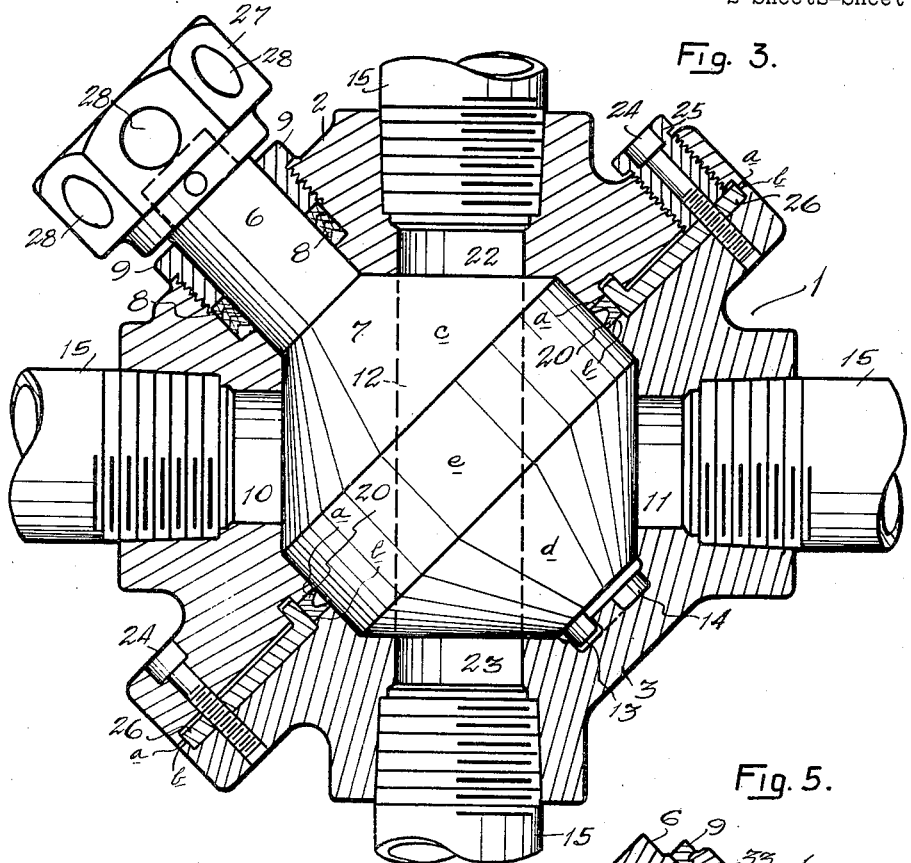
Fig. 3.
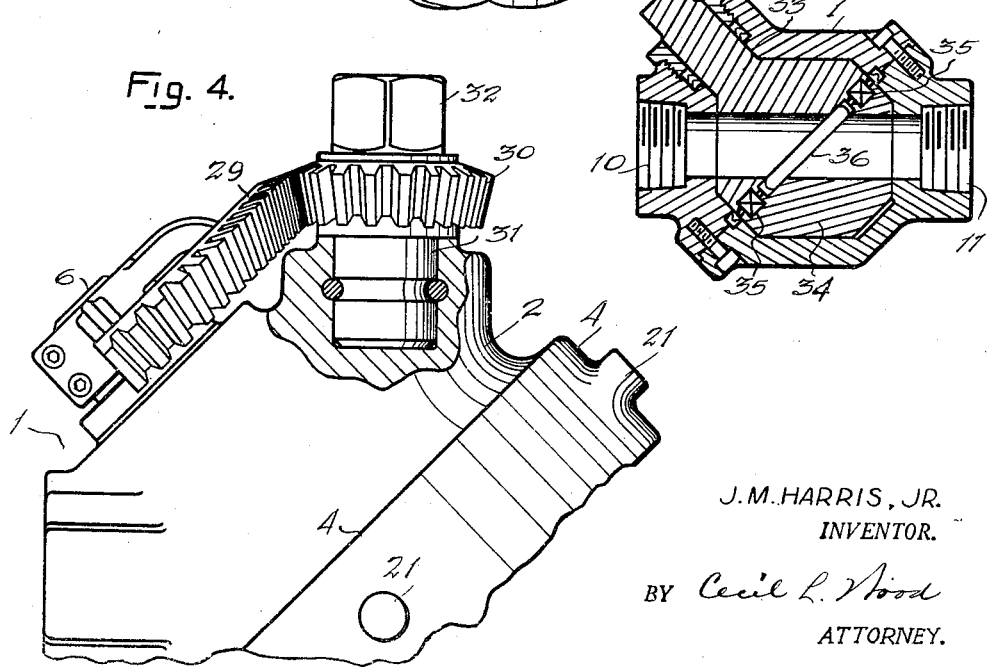
Fig. 4.
Fig. 5.
J. M. HARRIS, JR.
INVENTOR.
BY Cecil L. Wood
ATTORNEY.

Patented Jan. 10, 1950

2,494,091

UNITED STATES PATENT OFFICE 2,494,091

FLOW VALVE

J. M. Harris, Jr., Fort Worth, Tex.

Application September 22, 1944, Serial No. 555,319

5 Claims. (Cl. 251—91)

This invention relates to valves for flow lines, and the like, and more particularly to a type of valve commonly known as a plug valve, and its primary object resides in the provision of a valve in which the plug is formed biconical thus affording an efficient closure without the usual requirement for providing a lubricant or special appurtenances for loosening the plug to effect its rotation, as in the case of the conventional tapered type of plug after extensive use.

Another object of the invention resides in the provision of a valve of simple and economical design capable of construction and use as a multiple line, or two-way valve, or where it is desirable to flow a fluid alternately into or from two different lines by simply rotating the plug one-half turn.

A further object of the invention is that of providing a valve in which is embodied features adapting the same to be adjusted as wear occurs on the plug or in the seats of the valve without removing the plug from the housing thus affording longer life and greater efficiency.

Yet another object of the invention is manifest in the provision of a high pressure fluid valve capable of use in flowing any type of fluid such as oil, water, acids, mud, cement, liquid rubber, or the like, regardless of temperatures, yet without leakage or sticking due to abrasives or corrosion.

A still further object of the invention resides in the provision of a valve having full, open port openings therethrough adapting the same to special use in oil well heads where swabbing operations must be performed and, due to its unique design, the valve has particular advantages in regulating the flow of oil wells where flow beans are utilized.

Broadly, the invention comprehends the provision of a flow valve which is simple in design and operation, yet capable of longer life than conventional valves of similar type due to the unusual adjustment features of the housing with relation to the plug which insures a close metal to metal contact and a consequent seal at all times without sticking even after long use and irrespective of the fluid substances with which it is employed.

While the foregoing objects are paramount, other and lesser objects will become manifest as the description proceeds, taken in connection with the appended drawings wherein:

Figure 1 illustrates the invention in vertical cross-section showing the sectional housing detachably embracing the plug, and showing the fluid passage diagonally through the plug in dotted lines.

Figure 2 is an elevational view of the invention illustrating the threaded ring by which the sectional housing is detachably joined.

Figure 3 illustrates, in vertical cross-section, a modified form of the invention showing four fluid passages and a modified arrangement for joining the housing sections.

Figure 4 fragmentarily illustrates the use of a gear and quadrant arrangement for operating the valve plug, and Figure 5 illustrates in vertical cross-section, another modification of the invention in which the plug is shown in two sections, separated through the main body of the plug and urged apart by a tensioned means.

The conventional type of tapered plug valve, although widely used, meets with some disapproval due to its inability to function properly after extensive use. This is due primarily to its tapered seat which frequently sticks and requires either a substantial force in operation or some means of raising it from its seat sufficiently to effect its rotation. In the latter operation there is the hazard of admitting abrasives to the metal surfaces and wear occurs causing subsequent leakage which is eliminated only by replacement of the valve or by refacing the surfaces, either of which is both expensive and annoying.

An object of the invention being to at least minimize the cost of operation and lessen the resultant delays occasioned by the necessity for repairs or replacements, special consideration has been accorded the new design with a view to economy and operation.

The invention, therefore, comprises a housing 1 which has two sections 2 and 3 joined, in the preferred manner, by an interiorly threaded ring 4, as shown in Figure 1. The top section 2 is formed with a neck portion 5 through which an opening is provided for the stem 6 of the biconical plug 7. The neck 5 is suitably recessed and threaded to receive packing 8 about the stem 6 and a packing gland, or follower 9.

The sections 2 and 3 have their joined surfaces a and b arranged diagonally with respect to the fluid passages 10 and 11 therein and which may generally be supposed to operate either in a vertical or horizontal plane. This arrangement accommodates the diagonal position of the plug 7 which, as previously stated, is biconical in form, that is, shaped with dual conical surfaces c and d directed oppositely and preferably having a circular surface e therebetween.

A bore 12 is arranged diagonally through the plug 7, with respect to its longitudinal axis, opening in each of the conical surfaces c and d on opposite sides of the plug 7 so that when the latter is rotated one-half turn in the housing 1 the bore 12 will be in alignment with the passages or parts 10 and 11 of the housing 1, as shown in Figure 1. A stop pin 13 is arranged in the lowermost end of the plug 7, opposite the stem 6, which extends into a semi-circular groove 14 in the housing section 3 and functions to stop the plug in its rotation when the bore 12 is in exact alignment with the passages 10 and 11. Pipe connections 15 are made with the passages 10 and 11 by any desirable method, such as by threading, as in Figures 1 and 3, or by flanges, or the like.

In Figure 1 the section 2 of the housing is formed about its periphery with a shoulder f and the ring 4 has an interiorly extending annular boss 16 which engages the shoulder f to draw the section 2 downwardly toward the section 3 when the lower portion of the ring 4 is threaded upon the section 3. Dowel pins 17 are arranged around the section 3 and project from its surfaces b to insure proper alignment of the two sections when joined. Screws 18 are threaded through the section 2 and bear downwardly against a hardened ring 19 between the sections 2 and 3 disposed within an annular space formed by grooves in the faces a and b of the sections.

The screws 18 provide for the adjustment of the sections 2 and 3 with relation to the plug 7 so that a proper seal can be maintained between the surfaces. The ring 19, in addition to its function as a bearing surface for the screws 18, serves to retain the packing ring 20 in contact with the circular surface e of the plug 7 and insure a proper seal between the sections 2 and 3 of the housing. When the valve is assembled the proper "drag" between the housing and the plug is accomplished by setting the screws 18, which are properly spaced about the periphery of the section 2, and the ring 4 tightened by applying a wrench or a hammer to the lugs 21 projecting from the ring 4. Obviously other devices may be provided for the purpose of turning the ring 4. In either of the structures herein shown and described a conventional lubricating means, such as grease fittings, may be employed for admitting a lubricant to the operating surfaces of the housing and plug.

In Figure 3 is shown a modification of the valve structure in which the housing sections 2 and 3 each have two ports, or fluid passages. The additional ports 22 and 23, in the sections 2 and 3, respectively, provide for a four-way connection to switch from one line to another, the bore 12 of the plug 7 being capable of proper alignment with either set of ports by a one-half turn. The position of the plug 7 in Figure 3 would shut off the valve in the structure shown in Figure 1.

The manner of attaching the housing sections 2 and 3, in the structure illustrated in Figure 3, differs from that of the valve in Figure 1 in that cap screws 24 are employed in securing the flanged sections together instead of the ring 4. Certain of the screws 24, however, at regular intervals around the housing are arranged through exteriorly threaded sleeves 25 which are threaded through the section 2 and bear downwardly against a ring 26 between the joining surfaces of the sections to effect the proper adjustment between the housing sections and the plug 7 before tightening the screws 24. This adjustment is accomplished much in the same manner as in the structure shown in Figure 1.

In the form of the invention shown in Figure 3 the stem 6 of the plug 7 is equipped with a head 27 for rotating the plug 7 which is capable of being manipulated with a wrench, being hexagon in form, or with a bar inserted through or into the apertures 28 around the member. The head 27 is made detachable so that any type of wrench can be applied to the stem 6 as in the structure employed in Figure 1.

For greater leverage, and especially on large valves, a gear and quadrant assembly may be employed, as in Figure 4. The quadrant 29 may be clamped upon the stem 7 in any suitable manner and the gear 30, on a stub shaft 31, can be journalled in the upper section 2 of the housing. In this manner a greater torque may be applied to the plug 7 for rotating the same. A wrench, or other tool, can be applied to the squared portion 32 of the shaft 31.

In Figure 5 is shown a modification of the invention in which the plug is in two parts, the upper and lower sections 33 and 34 being separated by a plurality of springs 35 or the light, arranged to urge the two sections outwardly against the inner walls of the housing 1 to insure a proper fit, or drag, on these surfaces and prevent leakage. In the forms of the invention shown in Figures 1, 2, 3 and 4, the proper clearance or tension is provided by the screw adjustments 18 or 24. A packing ring 36 is arranged between the sections 33 and 34 of the plug, in the structure shown in Figure 5, to prevent leakage around the juncture of the ports through the said plug sections.

Manifestly, certain changes and modifications may be resorted to from time to time by persons skilled in the art without departing from the spirit and intent of the invention and the scope of the appended claims.

What is claimed is:

1. In a valve for flow lines, in combination, a housing comprising a pair of sections detachably joined, each having an annular recess in its joining face providing a continuous annular space between the joined sections, a ring arranged in said space, a fluid passage in each housing section having means for connecting a flow line thereto, a biconical plug rotatably arranged in the said housing having a bore therethrough opening into each of the conical faces of the said plug and on opposite sides thereof, the said bore being adapted for alignment with the said passages by the rotation of the said plug and screws arranged in said housing adjustably engageable with said ring providing means for adjusting the said housing sections with relation to each other and the said plug.

2. A valve for flow lines, and the like, having a sectional housing including sections detachably joined and having fluid passages therein with means for connecting flow lines thereto, a biconical plug rotatably arranged in the said housing having a bore therethrough opening in each of its conical faces on opposite sides of the said plug and adapted to be aligned with the said passages upon the rotation of the said plug, means comprising an adjusting ring disposed between the said sections and spacing screws cooperating with said ring for adjusting the said housing sections with relation to each other and the operating surfaces of the said plug.

3. In a valve for flow lines, and the like, in combination, a housing having paired sections detachably joined and sealed, a ring disposed between the meeting surfaces of said sections, a fluid passage in each section of the said housing having means for attaching a flow line thereto, a biconical plug rotatably arranged in the said housing having a bore therethrough opening into each conical face thereof on each side of the said plug adapting the same to alignment with the said passages as the plug is rotated and a plurality of screws in said housing sections cooperating with said ring providing means for adjusting the said housing sections with relation to each other and the said plug.

4. In a valve for flow lines, or the like, in combination, a housing having paired sections formed with detachably joined flanges, each having an annular groove in its face forming an annular space between said sections when joined, a ring arranged in said space, a fluid passage in each section of the said housing having means for connecting a flow line thereto, a biconical plug rotatably arranged in the said housing having a bore therethrough opening in each of its conical faces on opposite sides of the said plug whereby the same can be aligned with the said passages by rotating the said plug, and spacing screws in one of said sections cooperating with said ring providing means for effecting the adjustment of the said housing with respect to the said plug.

5. In a valve for flow lines, or the like, in combination, a housing having paired sections formed with detachably joined faces, a groove in each face capable of forming an annular space between the said faces when joined, a hardened ring arranged in said space, a fluid passage through each section of the said housing having means for connecting a flow line thereto, a biconical plug rotatably arranged in the said housing having a bore therethrough opening in each of its conical faces on opposite sides of the said plug whereby the same can be aligned with the said passages by rotating the said plug, and adjusting screws in one of said sections cooperating with said ring providing means for maintaining a close operating association of the surfaces of the said housing and the said plug.

J. M. HARRIS, Jr.

REFERENCES CITED

The following references are of record in the file of this patent:

UNITED STATES PATENTS

| Number | Name | Date |
|---|---|---|
| 715,113 | Mitchell | Dec. 2, 1902 |
| 2,032,623 | Lewis | Mar. 3, 1936 |
| 2,292,873 | Finegan | Aug. 11, 1942 |

FOREIGN PATENTS

| Number | Country | Date |
|---|---|---|
| 48,234 | Germany | Nov. 14, 1888 |